Patented Mar. 18, 1941

2,235,534

UNITED STATES PATENT OFFICE 2,235,534

COMPOSITION OF MATTER AND METHOD OF MAKING SAME

Kenneth Lyman Russell, Nutley, N. J., and Adam Carr Bell, New York, N. Y., assignors to Colgate-Palmolive-Peet Company, Jersey City, N. J., a corporation of Delaware No Drawing. Application February 11, 1939, Serial No. 255,854

24 Claims. (Cl. 260—400)

This invention relates to the preparation of new chemical compounds of unusual properties which are suitable for use as deterging, washing, wetting, emulsifying, dispersing, penetrating, solubilizing and like agents, which compounds may be prepared from substances having a saturated 1, 4 butylene oxide ring. More particularly the invention relates to the production of these agents from tetrahydrofurfuryl alcohol and the alkylated derivatives thereof.

In recent years a great deal of scientific investigation has been conducted in connection with the heterocyclic compounds containing the furane ring. Furfural is now economically prepared from oats in commercial quantities, and, for this reason, efforts have been directed toward finding as many uses for this substance as possible. However, it has never been satisfactorily used in the preparation of wetting, washing and like agents. Among the derivatives of this substance is the hydrogenation product, tetrahydrofurfuryl alcohol, which is used in the preparation of organic solvents, plasticisers, and the like, but which has never been converted to a satisfactory detergent or wetting agent.

According to the present invention, it has been discovered that highly desirable washing, emulsifying and wetting agents can be prepared from tetrahydrofurfuryl alcohol and the related compounds containing a saturated 1, 4 butylene oxide ring. It has been found that sulphonated long chain lipophilic derivatives of these compounds possess properties which make them particularly suitable for use in laundering and other textile operations, in the preparation of cosmetic creams, and in like processes.

It has also been discovered that the treatment of compounds possessing the saturated 1,4-butylene oxide ring, with or without alkylol- alkyl, halogen and/or other substituents, with concentrated sulphuric acid or its derivatives produces polyhydric alcohol sulphates, with or without other substituent groups, depending on the initial reactants. These sulphates, if at least one hydroxy group is substituted by long chain lipophilic radicals, such as acyloxy and alkoxy groups, will have unusually good emulsifying, sudsing and like properties.

The preferred substance to be treated by the process of this invention to produce the best products at lowest cost, is tetrahydrofurfuryl alcohol (1 methylol-1,4 butylene oxide). With this substance it is possible to prepare sulphonated derivatives of pentane-triol and pentane-diol, including 1 methylol-1, 4 butylene glycol. According to the preferred process of this invention, the tetrahydrofurfuryl alcohol is treated with concentrated sulphuric acid or its equivalent and a fatty acid, fatty oil or other fatty acid ester. The order of mixing or reacting these agents is not critical, but it is preferable to combine the alcohol with the sulphonating agent before treatment with the fatty material. It is also possible to prepare the tetrahydrofurfuryl ester of the fatty acid alone or in admixture with the corresponding partial glycerides and then to treat with the sulphonating agent. After completion of the reaction, the product is neutralized with a suitable base and then prepared in its inorganic salt-free state by purification with alcohols or other suitable solvents, such as dioxane, diethylene glycol monoethyl ether, ethylene glycol monoethyl ether, ethylene glycol monoethyl ether acetate, monofatty acid esters of ethylene glycol, monoglycerides of coconut oil fatty acids, isobutyric acid, and water-soluble aliphatic ketones. Such purification is effected by treating the organic sulphate salt or solutions thereof with at least one of the foregoing solvents and separating the solvent layer containing the purified organic sulphate from the by-product salts or aqueous solutions thereof, as, for example, according to the procedure in the copending application, Serial No. 253,808, filed January 31, 1939. It may also be effected by preparation of the calcium salt, removal of the insoluble calcium sulphate, and preparation of the other salts by base exchange reactions. The product, with or without the by-product sulphate, may be dried by spray or rolls and is suitable for use in the various operations suggested above.

While the process is particularly adapted to the preparation of sulphated polyhydroxy-substituted pentane esters of fatty acids, it may be modified to include the preparation of sulphated polyhydroxy-substituted pentane esters of other acids such as naphthenic acid, abietic acid, hydrogenated abietic acid, acids from oxidized mineral oil, halogenated fatty acids, or any other carboxylic acid. For products having hydrophilic-lipophilic properties, it is preferred to use acids having at least six carbon atoms. The process can likewise be modified to produce sulphated ethers of polyhydroxy-substituted pentane by treating the ethers of tetrahydrofurfuryl alcohol with the sulphonating agent. The alcohols which may be used include long chain aliphatic alcohols such as dodecanol, benzyl alcohol, ceryl alcohol, cyclohexanol, polyglycols and ethers thereof, abietyl alcohol, hydrogenated abietyl alcohol, and any other compound possessing an alkylol radical. The process is capable of forming mono- and poly-sulphated products as well as mono- and poly alkoxy and/or acyloxy derivatives of the opened cyclic ether.

In order to give a better understanding of the present invention, but in no way to limit the scope thereof, the following examples are given:

Example I 71 parts of tetrahydrofurfuryl alcohol are added with stirring to 541 parts of cold 100% sulphuric acid. The temperature of the mixture is raised to 50° C. by means of a bath surrounding the reaction flask. To this mixture is then slowly added 216 parts of coconut oil. The reaction mixture is heated for an hour after the oil is added. The reaction mixture forms a clear solution upon dilution with water. The sulphated material is poured on ice and neutralized with 30.5° Bé. caustic soda solution. The neutralized material, which contains about 35 parts of active ingredient and 65 parts of sodium sulphate, is dried by passing over steam-heated rolls to yield a light tan product.

Other concentrations of acid, including 95% acid, 12.5% oleum, and 20% oleum, can be used. The lower concentrations of acid produce materials of lighter color. The preferred concentration is about 100% sulphuric acid.

Example II 71 parts of tetrahydrofurfuryl alcohol are refluxed for about 2 hours with 216 parts of coconut oil and 1 part of solid sodium hydroxide until the product becomes alcohol-soluble and then for about 1 hour longer. 263 parts of the mixed ester product thus obtained are held at 35° C., while 496 parts of 100% sulphuric acid are slowly added through a dropping funnel over a period of 1 hour. The heating at 35° C. is continued for about 1.5 to 2 hours after the acid is added. The sulphated material is treated in the same manner as that given in Example I to yield a relatively white powder.

The example may be modified by merely mixing the tetrahydrofurfuryl alcohol with fatty oil without alcoholysis of the oil before treating with the sulphuric acid.

Example III 213 parts of tetrahydrofurfuryl alcohol are added to 1082 parts of chilled 100% sulphuric acid. The temperature of the mixture is raised to 50° C., and 392 parts of lauric acid are added in powder form. The mixture is stirred for 1.5 hours at a temperature of 50° C. The product is neutralized as in Example I. A part of the neutralized product is roll-dried to give a product of light tan color. Another part thereof is extracted with n-butanol to yield a sodium sulphate free material. The n-butanol is removed by vacuum distillation until crystallization of the product begins. It is then filtered to yield a product which, in the form of a powder, is light tan or white and possesses excellent deterging, emulsifying, wetting, and foaming properties. It is washed with ether and dried. The analysis of the product shows it to have the following most probable composition:

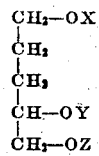

wherein one of the symbols X, Y and Z represents a —SO₃Na radical, another represents a hydrogen, and the third represents a lauroyl radical, all substituted on the 1, 2, 5 pentane triol or 1-methylol-1,4 butylene glycol nucleus.

Example IV

Tetrahydrofurfuryl laurate is prepared according to the method of U. S. Patent 1,802,623 by refluxing a mixture of 51 grams of tetrahydrofurfuryl alcohol, 91.5 grams of lauric acid, 190 grams of benzene and 3 drops of 95% sulphuric acid until nearly the theoretical amount of water is removed. 0.4 gram of potassium acetate is then added, and the refluxing is continued, so that the time consumed for the total operation is about twelve hours. The benzene is removed, and the remaining ester is vacuum distilled at about 9 mm. pressure. To 30 grams of the water-white liquid ester are then slowly added 58 grams of 100% sulphuric acid at 35° C. After the acid is all added, the temperature is raised to 50° C., and the mixture is held at that temperature for ¼ hour. A portion of the mixture is periodically tested and, when a clear solution is obtained by dilution with water, the mixture is stirred for 45 minutes longer, poured on ice and then neutralized with caustic soda solution. The product is roll-dried to a light colored powder.

The example may be modified by using a proportionate quantity of caprylic acid instead of the lauric acid. The sodium sulphate-free product thereof in the form of a powder is tan colored.

Example V

To 50 parts of tetrahydrofurfuryl palmitate, held in a flask surrounded by a bath at 35° C., 97 parts of 100% sulphuric acid are added. The bath temperature is then raised to 50° C., and the mixture is held at that temperature for one hour with constant stirring. The mixture is then neutralized with caustic soda and roll-dried to a substantially white water-soluble product.

Example VI

To 125 parts of tetrahydrofurfuryl alcohol are added, with suitable precautions, 10 parts of clean sodium. The reaction is aided by gentle heating. When all the sodium is dissolved, a solution of 125 parts of the sodium salts of the acid sulphates of the fatty alcohols, derived by hydrogenation from coconut oil (predominantly lauryl alcohol), in 250 parts of tetrahydrofurfuryl alcohol is added. The mixture is refluxed for about 7 hours in an oil bath at 200° C. It is then poured into 1500 parts of hot water, cooled, and taken up in ether. Vacuum distillation yields a nearly colorless liquid of B. P. 175–185° C. at 6 mm. 52.5 parts of 100% sulphuric acid are dropped into 25 parts of the tetrahydrofurfuryl ether. The mixture is permitted to stand at room temperature overnight. It is then stirred at 45° C. for half an hour. The reaction mixture is then poured into 500 parts of ice and water and neutralized with a 24% sodium hydroxide solution. The product is roll-dried, giving a water-soluble powder.

Example VII

To 1087 parts of well-chilled 20% oleum is added with stirring 106 parts of tetrahydrofurfuryl alcohol. To the mixture is then added 408 parts of lauric acid. The mixture is allowed to warm to 50° C., at which temperature it is held for 5 hours. It is then poured into 10,000 parts of ice and water and neutralized with 3,700 parts of 23.6% sodium hydroxide solution. The resulting solution is clear and brown. The product is probably a dilaurate of a pentanetriol sulphate.

Example VIII 114 parts of 100% sulphuric acid are cooled with an ice bath. 18.5 parts of tetrahydrofurfuryl alcohol are added dropwise with stirring. The bath is then warmed to 50° C. and held at that temperature, and 38.6 parts of myristic acid are added over a period of about ½ hour. Stirring is continued with the bath at 50° C. for another hour. The reaction mixture is neutralized with aqueous sodium hydroxide while being cooled internally with ice. The product is made sodium sulphate-free by extraction with normal butanol. The salt-free product is a light tan powder.

The process may be modified by substituting capric acid, palmitic acid, or mixed coconut oil fatty acids for the myristic acid with suitable variation of the proportion of tetrahydrofurfuryl alcohol. The product prepared from myristic acid or palmitic acid shows outstanding detersive and lathering properties.

Example IX 167 parts of the residue obtained in the hydrogenation of furfural, which contains a substantial proportion of 1, 2- and 1, 5-pentan-diols and 1, 2, 5-pentan-triol, are slowly added to 1,052 parts of chilled 102.8% sulphuric acid. The temperature of the mixture is permitted to rise to 50° C., and 432 parts of coconut oil are added. The reaction mixture is stirred for 1 hour at 50° C. after all the oil has been added. It is then neutralized and roll-dried. The product is brown in color and readily soluble in water.

Example X 180 parts of the residue obtained in the hydrogenation of furfural is distilled at 10 mm. pressure, and the fraction boiling at about 185° C. is separated. 8.5 parts of this fraction (essentially 1, 2, 5-pentantriol) are slowly added to 52.6 parts of chilled 102.8% sulphuric acid. The temperature is then raised to 50° C., and 21.6 parts of coconut oil are slowly added. The reaction mixture is held at 50° C. for another 1.5 hours and is then neutralized. A 1.0% solution of the product in water is clear and brown.

The above examples are merely illustrative, and various modifications thereof may be made, e. g. it is also possible to add the fatty acid or oil to the sulphuric acid before introducing the tetrahydrofurfuryl alcohol.

In the neutralization of these products, it is preferable to have the alkali and acid product brought into confluence in the presence of a large excess of previously neutralized material, with suitable pH and temperature control. Other bases than sodium hydroxide may be employed including alkali metal bases, carbonates and salts of other weak acids; basic compounds of calcium, magnesium, mercury and other metals; ammonia; amines, such as mono-, di-, and triethanol amine, mono-, di- and tri-glycerol amine, butyl amine, amyl amine, methyl amine, ethyl amine, aniline, nicotine, betaine, pyridine and piperidine. As indicated hereinbefore, the calcium salt may first be prepared and the calcium sulphate separated therefrom. The other salts may be prepared by reacting the calcium salt with a soluble salt of the desired cation and an acid which forms insoluble calcium salts, e. g. potassium sulphate, or by other base exchange reactions.

As indicated above, the sulphonating agent is preferably 100% sulphuric acid in order to obtain maximum yields of products having the best color and lathering, foaming, and emulsifying properties. However, it is possible to use other sulphonating agents such as sulphur trioxide, fuming sulphuric acids, chlorsulphonic acid, amino sulphonic acid, organic amino sulphonic acid, sulphuryl chloride, 95% sulphuric acid or any concentrated sulphuric acids, ethyl sulphuric acid, acetyl sulphuric acid, and other mono alkyl and acyl derivatives of sulphuric acid.

The present invention is directed preferably to the treatment of compounds having a saturated butylene oxide ring with sulphuric acid or derivatives thereof, but it is within the scope thereof to use other strong mineral acids, such as hydrochloric or nitric acid, either alone or along with sulphuric acid, to prepare the corresponding derivatives. If, for example, tetrahydrofurfuryl alcohol is treated with HCl, the chlor derivatives of polyhydroxy substituted pentanes will similarly be formed. These may be converted to other derivatives by treatment with sodium sulphite, ammonia, or the like, to form sulphonates, amines, or similar derivatives. Hence, by the process of this invention, it is possible to prepare the true sulphonate as well as sulphate derivatives of pentan-diols and pentan-triol and the partial ethers and carboxylic acid esters thereof, with or without the other substituent radicals hereinbefore mentioned. It is also possible to use phosphating or borating agents alone or in conjunction with the sulphonating agents. Such agents include P₂O₅, PCl₃, POCl₃, pyrophosphoric acid, phosphoric acid, boric acid, and the like. Esterification assistants, such as acetic anhydride and propionic anhydride, may also be used in the reaction.

The ratio of sulphonating agent to the butylene oxide compound is usually greater than one molecular weight of sulphonating agent to one mole of said compound. It is generally preferred to have the proportion of sulphonating agent appreciably greater than that indicated by the above ratio because of its solubilizing effect on the fatty material entering into the reaction and also to insure completion of reaction. If a mixture of esters of butylene oxide compounds and alcohols other than those containing a butylene oxide ring are to be prepared, e. g. the products obtained by reacting fatty oil, tetrahydrofurfuryl alcohol and sulphuric acid, the proportion of sulphonating agent is usually in excess of that indicated by the ratio of one molecular weight of sulphonating agent to each mole of butylene oxide compound and alcohols other than those containing the butylene oxide ring. The proportions of phosphating, borating, and related agents, alone or in combination with sulphonating agents, may be similarly selected.

Of course, if it is desirable to prepare the di- or poly-esters of these inorganic acids, the proportion of acidifying agent should be correspondingly increased.

If desired, materials may be added which act either as refrigerants and/or solvents, such as liquid sulphur dioxide, chloroform, ether, petroleum ether, ethylene dichloride, trichlorethylene, tetrachlorethane, solid carbon dioxide, and liquefied normally-gaseous paraffins such as propane or butane. Any of these may be used separately or in any desired combination. Since liquid sulphur dioxide is a more universal solvent for sulphonating agents and other reactants, this solvent or combinations thereof is most suitable and may be mixed with the acid and/or the other reactants before these reagents are combined.

Although the preferred material to be treated by the process of this invention is the tetrahydrofurfuryl alcohol, it is possible to use other compounds having the saturated 1, 4 butylene oxide ring. For example, it is possible to employ other tetrahydrofurfuryl ethers and esters, including alcoholic and phenolic ethers, tetrahydrofurfuryl amine, tetrahydrofurfuryl halides, or the corresponding acids and esters as well as the alkylated and halogenated derivatives thereof; hydrogenated derivatives of the cyclic ethers prepared by dehydrating pentoses, hexoses, and higher aldehydic sugars; polyhydrogenated coumarone, and the like. It is also possible to use one or more of these materials alone or in combination with other mono- or polyhydric alcohols and partial ethers and esters of said polyhydric alcohols such as glycerine, monoglycerides, polyglycerines, glycols, polyglycols, mannitol and other hexites, erythritol, glyceric acid, lauryl alcohol, as well as pentan-diol and pentan-triol, and similar substances. The reaction can likewise be conducted with additions of aromatic hydrocarbons, such as naphthalene, diphenyl, and alkylated derivatives thereof, and aromatic extracts of petroleum, to produce complex products.

The fatty acids and derivatives thereof which can be employed in the preferred process include coconut oil, garbage grease, tallow, olive oil, castor oil, hardened fish oils, tall oil, palm oil, soy bean oil, and the various fatty acids of these oils or rosin acids alone or in combination. Halogenated acids or oils may be employed as well as the acid halides of the various acids. It is also possible to use other esters of the fatty acids, including long chain alcohol esters of the wax type such as montan wax, carnauba, spermaceti and the like.

Although the new materials possess unusual derging, sudsing, and water-softening properties by themselves, their action may be augmented by the addition of any of the common auxiliary agents used in soap and detergent compositions. Suitable addition agents are other emulsifying agents, including soaps, rosinates, long chain alcohol sulphates, alkylated aromatic sulphonic acid salts, sulphonated mineral oil extracts, Turkey red oil, lecithin, glycerolamines, diethanolamine and triethanolamine soaps; coloring matter, such as dyes, lakes, and pigments; abrasives and inert fillers, such as silica, pumice, feldspar, precipitated chalk, infusorial earth, bentonite, talc, starch, and air; liquids, including carbon tetrachloride, perchlorethylene, trichlorethylene, glycerine, ethyl alcohol, tetrahydrofurfuryl alcohol, phenol, cyclohexanol, water, tetralin, hexalin, pine oil, mineral oil, mineral oil extracts, and naphtha; perfumes and deodorants; fats, oils, fatty acids, monoglycerides, linoleic acid, waxes, gums, or resins, germicides, such as phenol, mercury chloride, phenyl mercury nitrate, phenyl mercury chloride, methyl salicylate and mercuric chloride; styptics; any of the common water-soluble salts, such as sodium sulphate, chloride, acetate, bicarbonate, sesquicarbonate, hypochlorite, thiosulphate, hydrosulphite, and hyposulphate, or the corresponding ammonium and potassium salts thereof. The type of addition agent to be used, of course, will depend on the ultimate use of the new composition.

The water-soluble, water-softening compounds of tetraphosphoric, pyrophosphoric or hexametaphosphoric acid and their alkali metal, ammonia, and amine salts or alkyl esters may also be added to these compositions.

The final detergent composition, with or without one or more addition agents, may be formed into beads, flakes, bars, chips, crystals, powders, solutions, liquid or plastic emulsions, pastes, creams, salves, or any other forms desired. The ingredients may be mixed by any of the common methods, such as grinding, stirring, kneading, crutching, and fusing. Drying of the mixed solutions may be effected by rolls, spraying or otherwise.

The compositions may be used in various ways, such as washing compositions for wood, metal, stone, glass, brick, masonry and painted surfaces; insecticides; cements; abrasive compositions; antiseptics; water softeners; deodorants and disinfectants; water paints and polishes; sizes, glues and adhesives, such as shellac and casein compositions; liquid, solid and paste tooth and mouth detergents; laundry detergents and other textile agents, including laundry blueing, bleaching, dyeing, and discharging compositions; depilatories; dust preventing compositions; fire extinguishing compositions; drain, lavatory and radiator cleaners; anti-freezing, anti-fogging, and anti-corrosion compositions; wood impregnants; electrolytic baths; etching compositions; cosmetics, shaving preparations, shampoos and hair wave lotions; fat-liquors for leather; photographic solutions; paint, stain and grease removers; dry cleaning compositions; rug cleaners; petroleum de-emulsifying compositions; fruit washing; and any compositions requiring wetting, washing, emulsifying, penetrating, solubilizing, dispersing and like agents.

As many apparently widely different embodiments of this invention may be made without departing from the spirit and scope thereof, it is to be understood that the applicants do not limit themselves to the specific proportions or embodiments thereof except as defined in the following claims.

We claim:

1. The process of preparing novel organic compounds which comprises reacting tetrahydrofurfuryl alcohol with coconut oil fatty acids and with concentrated sulphuric acid.

2. The process of preparing novel organic compounds which comprises reacting tetrahydrofurfuryl alcohol with coconut oil fatty acids and with a sulphonating agent.

3. The process of preparing novel organic compounds which comprises reacting a compound having a saturated butylene oxide ring with a fatty acid and a sulphonating agent.

4. The process of preparing novel organic compounds which comprises reacting tetrahydrofurfuryl alcohol with a fatty oil and a sulphonating agent.

5. The process of preparing novel organic compounds which comprises reacting a compound having a saturated butylene oxide ring with a fatty oil and a sulphonating agent.

6. The process of preparing novel organic compounds which comprises reacting tetrahydrofurfuryl alcohol with a substance capable of yielding a fatty acid on hydrolysis, and a sulphonating agent, to yield an acid sulphate of a polyhydroxy pentane partial fatty acid ester.

7. The process of preparing novel organic compounds which comprises reacting a compound having a saturated butylene oxide ring with a substance capable of yielding a fatty acid on hydrolysis and a sulphonating agent.

8. The process of preparing novel organic compounds which comprises reacting tetrahydrofurfuryl alcohol with a sulphonating agent and a material of a class consisting of carboxylic acids, alcohols, phenols, and substances capable of yielding such materials on hydrolysis, to yield a substituted polyhydric alcohol sulphonate.

9. The process of preparing novel organic compounds which comprises reacting tetrahydrofurfuryl alcohol with a strong mineral acid and a material of a class consisting of carboxylic acids, alcohols, phenols, and a substances capable of yielding such materials on hydrolysis, to yield a substituted polyhydric alcohol derivative of the mineral acid.

10. The process of preparing novel organic compounds which comprises reacting a compound having a saturated butylene oxide ring with a sulphonating agent and a material of the class consisting of carboxylic acids, alcohols, phenols, and substances capable of yielding such materials on hydrolysis, to yield a substituted polyhydric alcohol sulphonate.

11. The process of preparing novel organic compounds which comprises reacting a compound having a saturated butylene oxide ring with a strong mineral acid and a material of the class consisting of carboxylic acids, alcohols, phenols, and substances capable of yielding such materials on hydrolysis, to yield a substituted polyhydric alcohol derivative of the mineral acid.

12. The process of preparing novel organic compounds which comprises reacting tetrahydrofurfuryl alcohol with at least an equi-molecular quantity of sulphuric acid, and neutralizing the product.

13. The process of preparing novel organic compounds which comprises reacting tetrahydrofurfuryl alcohol with a strong mineral acid and neutralizing the reaction product.

14. The process of preparing novel organic compounds which comprises reacting a compound having a saturated butylene oxide ring with a sulphonating agent and neutralizing the product.

15. The process of preparing novel organic compounds which comprises reacting a compound having a saturated butylene oxide ring with a polybasic mineral acid and neutralizing the reaction product.

16. The process of preparing novel organic compounds which comprises reacting a compound having a saturated butylene oxide ring with a strong mineral acid and neutralizing the reaction product.

17. Salts of partial sulphuric acid esters of compounds having a 1, 4 butylene glycol nucleus.

18. Salts of partial sulphuric acid esters of compounds having a 1 methylol-1, 4 butylene glycol nucleus.

19. Sulphuric acid esters of 1, 2, 5 pentan-triol derivatives of the class consisting of partial ethers and partial carboxylic acid esters.

20. Salts of partial sulphuric acid esters of 1 methylol-1, 4 butylene glycol partial carboxylic acid esters.

21. Salts of partial sulphuric acid esters of 1 methylol-1, 4 butylene glycol partial ethers.

22. Partial carboxylic acid esters of partial inorganic strong mineral acid esters of compounds having a 1, 4 butylene glycol nucleus.

23. Partial carboxylic acid esters of sulphonated compounds having a 1, 4 butylene glycol nucleus.

24. Partial carboxylic acid esters of 1 methylol-1, 4 butylene glycol partial esters of strong mineral acids.

KENNETH LYMAN RUSSELL.
ADAM CARR BELL.